US008363579B2

(12) United States Patent
Li et al.

(10) Patent No.: US 8,363,579 B2
(45) Date of Patent: Jan. 29, 2013

(54) APPARATUS AND METHOD OF COMMUNICATION IN A WIRELESS NETWORK

(75) Inventors: Guoqing Li, Hillsboro, OR (US); Praveen Gopalakrishnan, Hillsboro, OR (US); Vallabhajosyula S. Somayazulu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 649 days.

(21) Appl. No.: 12/329,655

(22) Filed: Dec. 8, 2008

(65) Prior Publication Data

US 2010/0142495 A1    Jun. 10, 2010

(51) Int. Cl.
*H04B 7/00* (2006.01)
*H04L 12/28* (2006.01)

(52) U.S. Cl. .................. 370/310; 370/329; 370/445

(58) Field of Classification Search .............. 370/338, 370/445, 447, 448, 229, 348; 455/421.1, 455/443, 444, 445, 447
See application file for complete search history.

(56) References Cited

U.S. PATENT DOCUMENTS

| 7,321,580 | B1 * | 1/2008 | Ramanathan et al. ........ 370/339 |
| 2005/0141451 | A1 | 6/2005 | Yoon et al. | |
| 2007/0036105 | A1 * | 2/2007 | Chun et al. ............. 370/329 |
| 2007/0081490 | A1 | 4/2007 | Kim et al. | |
| 2008/0089425 | A1 * | 4/2008 | Karczewicz ........... 375/240.23 |
| 2009/0233549 | A1 * | 9/2009 | Maltsev et al. ........... 455/41.2 |

FOREIGN PATENT DOCUMENTS

| KR | 10-2007-0048501 | 5/2007 |
| KR | 10-2008-0069524 | 7/2008 |

OTHER PUBLICATIONS

Xue et al, "Enhanced IEEE 802.15.3 MAC Protocol for Efficient Support of Multiple Simultaneous Operating Piconets", Published by IEEE Jul. 2008.*
Fittipaldi et al, "IEEE 802.15.3C Medium Access Controller Throughput for Phased Array System", Published by IEEE 2007.*
International Search Report and Written Opinion of PCT Application PCT/US2009/065588, mailed Jun. 18, 2010.
International Preliminary Report on Patentability for PCT Application PCT/US2009/1065588, mailed Jun. 23, 2011; 6 pages.
Office Action for Chinese Patent Application No. 200910260570.3 mailed on Feb. 29, 2012.
Peng Xue,"Enhanced IEEE 802.15.3 MAC Protocol for Efficient Support of Multiple Simultaneously Operating Piconets", IEEE Transactions on Vehicular Technology, vol. 57, No. 4, Jul. 2008; 12 pages.
Domenico Antonio Fittipaldi et al., "IEEE 802.15.3C Medium Access Controller Throughput for Phased Array Systems", The 18th Annual IEEE International Symposium on Personal, Indoor and Mobile Radio Communications (PIMRC'07), published on Dec. 31, 2007; 5 pages.

* cited by examiner

*Primary Examiner* — Ian N Moore
*Assistant Examiner* — Thai Nguyen
(74) *Attorney, Agent, or Firm* — Shichrur & Co.

(57) ABSTRACT

A wireless communication device and a method of communication in a wireless personal area network (WPAN) are provided. The method includes assigning a shared channel time allocation across one or more neighbored networks, announcing the shared channel time allocation to the one or more neighbored networks enabling the neighbored network use the shared channel time allocation and communicating using a directional network access protocol on the shared channel time allocation which is towered directed to a communicated device.

28 Claims, 3 Drawing Sheets

APPARATUS AND METHOD OF COMMUNICATION IN A WIRELESS NETWORK

BACKGROUND OF THE INVENTION

A personal wireless area network (WPAN) is a network used for communication among computing devices (for example, telephones and personal digital assistants, laptops and the like) close to one person. The devices may, or may not, belong to the person in question. The reach of a WPAN may be a few meters. WPANs may be used for intrapersonal communication among the personal devices themselves, or for connecting via an uplink to a higher level network and the Internet. Personal area networks may be wired with computer buses such as a universal serial bus (USB), FireWire and the like.

The IEEE 802.15.3 Task Group 3c (TG3c) which was formed in March 2005. TG3c is developing a millimeter-wave (mmWawe) based alternative physical layer (PHY) for the existing 802.15.3 Wireless Personal Area Network (WPAN) Standard 802.15.3-2003.

This mmWave WPAN may operate in a frequency band including 57-64 GHz unlicensed band defined by FCC 47 CFR 15.255. The millimeter-wave WPAN allows high coexistence, in a close physical spacing, with all other microwave systems in the 802.15 family of WPANs.

In addition, the millimeter-wave WPAN may allow very high data rate over 2 Gbit/s applications such as high speed internet access, streaming content download (e.g., video on demand, high-definition television (HDTV), home theater, etc.), real time streaming and wireless data bus for cable replacement for example, wireless display (WD).

However, unlike natural video where contents in frames are constantly moving, a synthetic personal computer (PC) video may include most of the time an unchanged video portion unless the user takes certain actions to change the PC view (e.g., move mouse, open a folder, open a file etc.). Such behavior may bring extremely bursty nature to the traffic pattern in that the size of the compressed video frame may vary dramatically over a short time scale. In addition, the synthetic video has very demanding delay requirements since the PC users expect invisible latency in PC response.

One way to accommodate such bursty traffic is to allocate sufficient channel time so that the peak data rate may be satisfied. Such scheme may lead to very poor channel utilization since most of time the channel is unutilized. On the other hand, a more dynamic way to deal with traffic variation is to adjust channel time allocation based on instantaneous traffic requirement. This scheme, however, requires explicit signaling with a piconet controller (PNC) to exchange channel time modification request and response, which may lead to increased latency in response to traffic dynamics. In addition, the channel time modification may only take effect in at least the next superframe. Moreover, there is a probability that channel time modification may not be fulfilled due to a busy schedule at the PNC, leading to unsatisfied delay performance.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
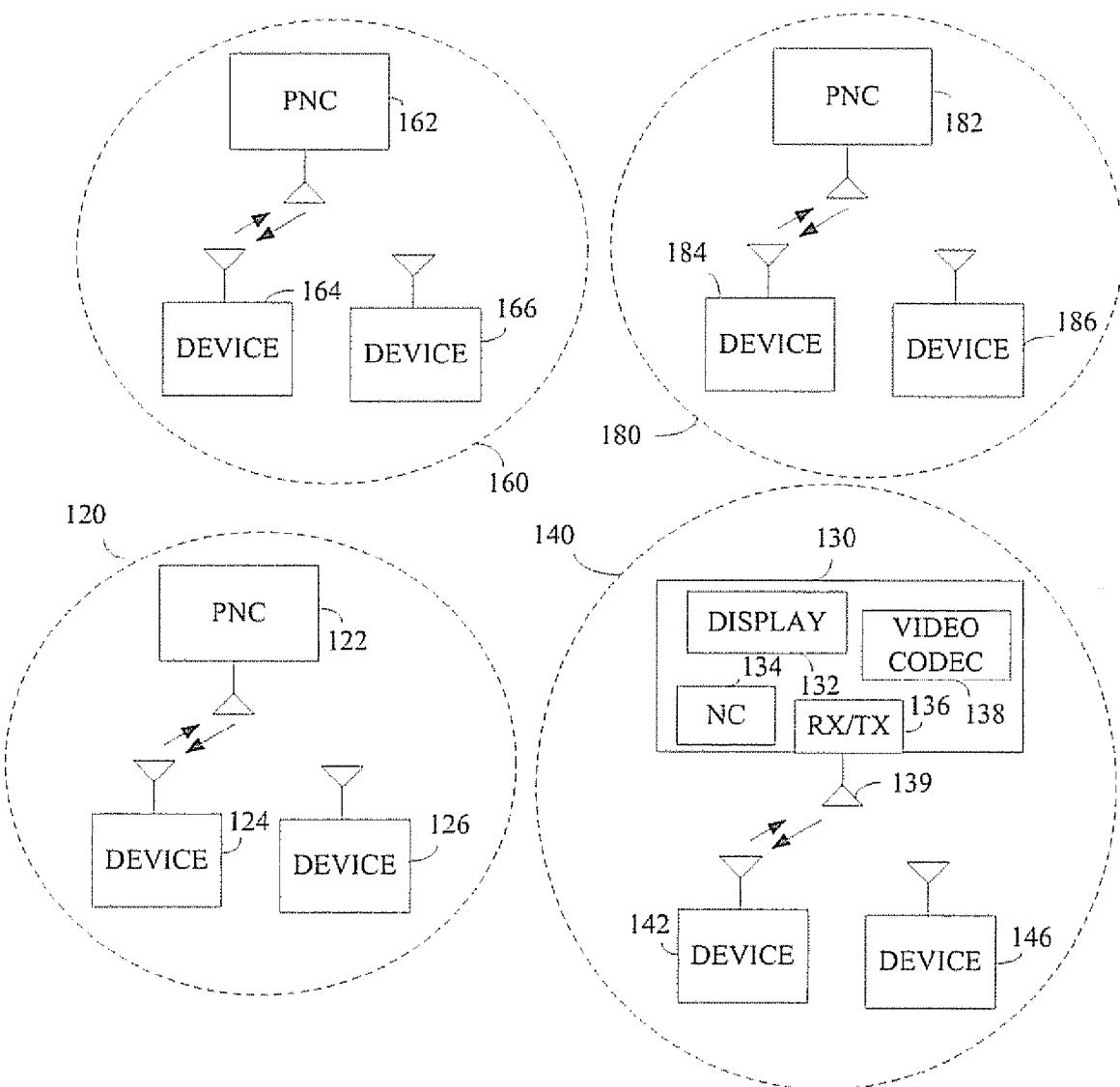
FIG. 1 a schematic illustration of multiple wireless communication networks according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, or transmission devices.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, wireless local area network (WLAN) stations, wireless personal network (WPAN), and the like.

Types of WPAN stations intended to be within the scope of the present invention include, although are not limited to, mobile stations, access points, stations for receiving and transmitting spread spectrum signals such as, for example, Frequency Flopping Spread Spectrum (FHSS), Direct Sequence Spread Spectrum (DSSS), Complementary Code Keying (CCK), Orthogonal Frequency-Division Multiplexing (OFDM) and the like.

Turning first to FIG. 1, a schematic illustration of multiple wireless communication networks according to some exemplary embodiments of the invention is shown. According to one exemplary embodiment of the invention, multiple wireless communication networks 120, 140, 160 and 180 may include WPAN, also known in the art as piconets. The WPAN may operate according to the standard developing by the IEEE 802.15.3 Task Group 3c (TG3c). TG3c is developing a millimeter-wave (mmWawe) based alternative physical layer (PHY) for the existing 802.15.3 Wireless Personal Area Network (WPAN) Standard 802.15.3-2003.

According to some exemplary embodiment of the invention, WPAN 120 may include a piconet coordinator (PNC) 122, a device 124 and a device 126. WPAN 140 PNC 130, a device 142 and a device 146. WPAN 160 may include a PNC 162, a device 164 and a device 166. WPAN 180 may include a PNC 182, a device 184 and a device 186. Although the scope of the present invention is not limited in this respect, PNC 122, 130, 162 and 182 may include a netbook computer, a laptop computer, a wireless display panel, a wireless video display or the like. Devices 124, 126, 142, 146, 164, 166, 184 and 186 may include a camera, a mouse, an earphone, a speaker, a display, a mobile personal device or the like.

According to example embodiment, WPAN 140 may include a piconet which is one of possible topologies for the IEEE 802.15.3 WPAN. For example, and according to one of the embodiments of the invention, the piconet may include PNC 130 and several slave devices, for example devices 142 and 146 within the transmission range of PNC 130. Any one of devices 142 and 146 may act as the PNC, if desire. The above description of piconet 140 is also applicable for piconets 120, 160 and 180, if desired.

According to at least one embodiment of the invention, a channel time in the piconet may be based on a superframe. For example, the superframe may include three major parts: a beacon, a Contention Access Period (CAP) and a Channel Time Allocation Period (CTAP). The PNC (e.g. piconet 130) may provide a basic timing for the piconet by broadcasting beacon packets. Beacons may be used to set the timing allocation and management information for the piconet. Devices 142 and 146 may synchronize themselves with PNC 130 by receiving the beacons. The CAP may be used for asynchronous data or communication commands. For example, a medium access control (MAC) mechanism may be used during the CAP and may include a Carrier Sense Multiple Access/Collision Avoidance (CSMA/CA). The CTAP includes the Channel Time Allocations (CTA) and the management CTAs (MCTAs). The CTA may be used for commands, isochronous streams and asynchronous data. The medium access is based on TDMA.

In computer networking, CSMA/CA belongs to a class of protocols called multiple access methods. In CSMA, a station wishing to transmit has to first listen to the channel for a predetermined amount of time so as to check for any activity on the channel. If the channel is sensed "idle" then the station is permitted to transmit. If the channel is sensed as "busy" the station has to defer its transmission. This is the essence of both CSMA/CA and CSMA/CD. In CSMA/CA (LocalTalk), once the channel is clear, a station sends a signal telling all other stations not to transmit, and then sends its packet. In Ethernet 802.3, the station continues to wait for a time, and checks to see if the channel is still free. If it is free, the station transmits, and waits for an acknowledgment signal that the packet was received.

According to some exemplary embodiments of the invention, piconets 120, 140 160 and 180 may produce a very bursty traffic. The very bursty traffic has a very high value of peak rate over average rate. mmWave communication system according to embodiments of the invention, may include a high channel utilization and very low latency. For example PNCs 122, 130, 162 and 182 piconets 120, 140 160 and 180, respectively, may include a wireless display (WD). An exemplary WD 130 may include a display 132 (e.g., liquid crystal display, Plasma display or the like), a network controller (NC) 134, a transceiver (RX/TX) 136, a video codec 139, and an antenna 139. For example, video codec 139 may be MPEG-4 based or H.264 based or a proprietary codec.

According, to some embodiments of the invention, transceiver 136 may employ antenna beam forming scheme in order to transmit a direct antenna beam to the device (e.g., device 142, device 146). Antenna 139 may include one or more antenna such as, for example, an internal antenna, a dipole antenna, an antenna array, a Yaggi antenna and the like.

According to some exemplary embodiments of the present invention, piconets 120, 140 160 and 180 may share their CTA with the other piconets, if desired. Specifically, the PNC of one of the piconets may assign a shared channel time allocation (SCTA) for traffic multiplexing across multiple bursty links. The PNC (e.g., PNC 130) may announce the SCTA so that neighbor links (e.g., links of piconets 120, 160 and 180) may join the SCTA and use a directional CSMA/CA during shared channel time. Since wireless display link presents extremely bursty traffic pattern, the likelihood that adjacent links having a data burst simultaneously is very low.

Figure 2:
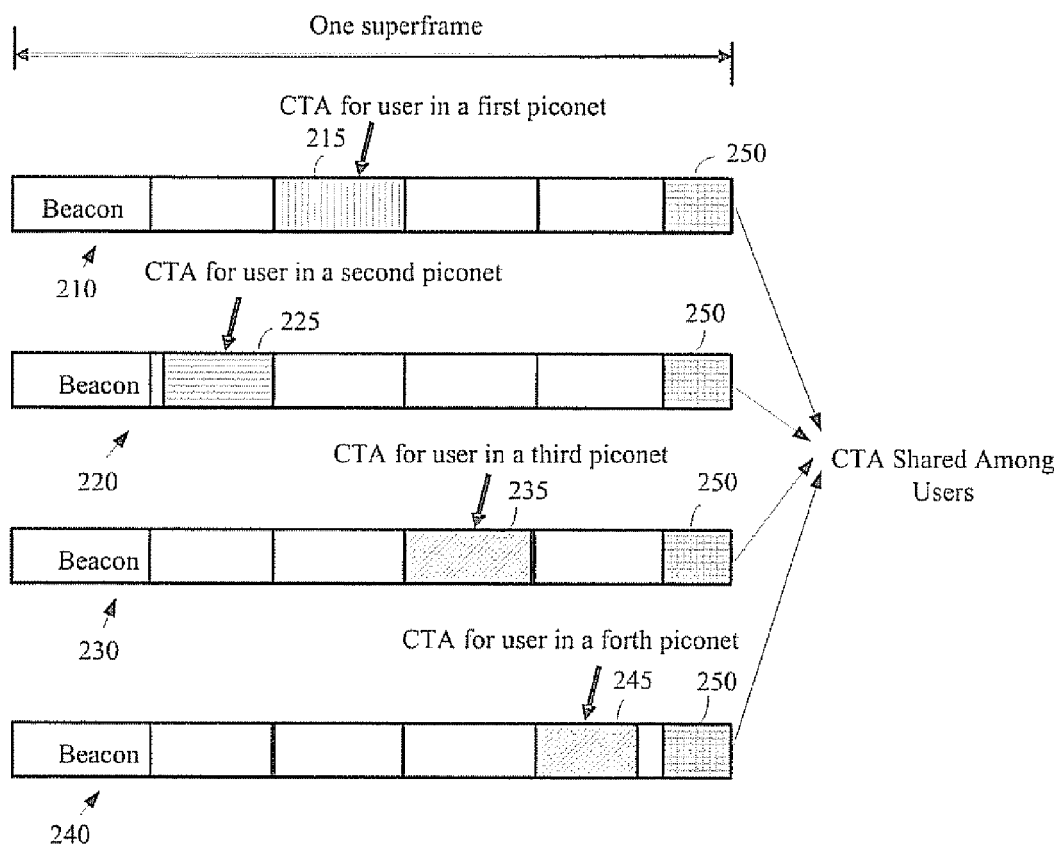
FIG. 2 is a schematic illustration of superframes of multiple piconets, according to some embodiments of the invention.

Turning to FIG. 2, a schematic illustration of superframes of multiple piconets, according to some embodiments of the invention is shown. According to this example, superframe of multiple piconets e.g., a superframe 210, a superframe 220, a superframe 230 and a superframe 240 may be synchronized to be transmitted at the same time, if desired. Thus, a shared CPA 250 is available of all users of piconets for example, piconets 120, 2140, 160 and 180, in the same time slot. Furthermore, superframes 210, 220, 230 and 240 may include dedicate CPAs 215, 225, 235 and 245, respectively. According to embodiments of the invention users of piconets 120, 2140, 160 and 180 may share their dedicated CPA, if desired. According to other embodiments of the invention, the PNC may adjust the length of the shared CTA and dedicated CTA based on traffic multiplexing requirements, although the scope of the present invention is not limited in this respect.

Figure 3:
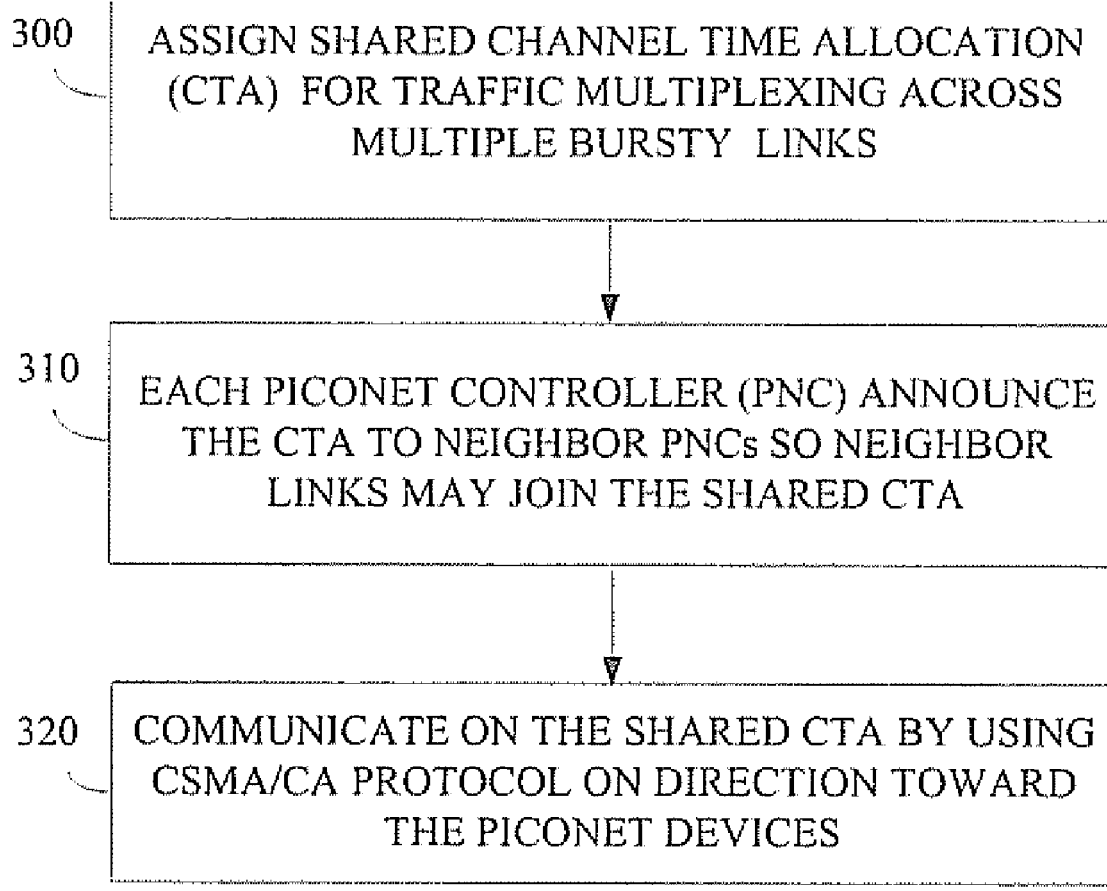
FIG. 3 is a flowchart of a method of sharing a channel time allocation between multiple wireless personal area networks, according to embodiment of the invention.

Turning to FIG. 3, a method of sharing a channel time allocation between multiple wireless personal area networks, according to embodiment of the invention is shown. Although the scope of the invention is not limited to this respect, the method may start with assigning the SCTA for traffic multiplexing across multiple bursty links of the different piconets (text block 300). For example, according to some embodiments of the invention, each PNC of each piconet may announce its shared CTA time in a sync beacon (e.g., shown with FIG. 2) while other PNCs listens (text box 310). According to this example, the other PNCs may choose to use or not to use the shared CTA based on a number of factors. For example, a PNC (e.g., PNC 130) may decide to use the SCTA based on the number of announced PNCs. i.e., based on how many piconets are using the same SCTA.

In other embodiments of the invention, in networks where synchronization may not be in place, the piconet controller (PNC) may announce the SCTA time in a specific frame stating the offset of the shared CTA with respect to the frame transmission. According to this example, neighboring PNCs overhearing current transmission may be able to derive the starting and ending time of the SCTA and join the SCTA, although the scope of the present invention is not limited in this respect.

Yet in other embodiments, the SCTA may also be used within one piconet. In this example, after the PNC announces the SCTA, the links within the piconet may decide whether or not to use the SCTA.

According to embodiments of the invention, the PNC which may use the SCTA may use directional CSMA/CA. Specifically, the carrier sensing is only performed on the direction toward the intended receiver/transmitter (text box 320). The carrier sensing may be performed when the device tries to use the Shared CTA and/or before each packet transmission during the SCTA.

Turning back to FIG. 1, according to one exemplary embodiments of the invention PNCs 122, 130, 162 and 182 may include a wireless display (WD). For example, PNC 130 may include NC 134. NC 134 may assign the SCTA across one or more neighbored networks (e.g., piconets 120, 160 and 180) and may announce the SCTA to the one or more neighbored networks which enables the neighbored network to use the SCTA. For example, NC 134 may announce the SCTA time to plurality of links of the same network.

Transceiver 136 may communicate with device 142 and 146 by using a directional network access protocol, for example a directional CSMA/CA, on the SCTA time slot which is toward or in a direction of the communicated device e.g., device 142. Furthermore, NC 134 of PNC 130 may synchronize links of said one or more neighbored networks to enable to transmit a superframe at a same time slot and to assign a dedicated CTA in different time slots at the superframe of the neighbored networks. NC 134 may assign the SCTA at the same time slot at the superframes of the other neighbored networks (e.g., superframes 210, 220, 230 and 240) and to adjust a length of the dedicated CTA and a length of the SCTA based on links traffic.

In other embodiments of the invention, NC 134 may announce the SCTA in a sync beacon while other neighbored networks listen. For example, NC 134 may announce the SCTA based on number of announced neighbored networks.

In this exemplary embodiment the WD may provide a base layer of data to be transmitted on the dedicated CTA time slot and to provide an enhancement data layer to be transmitted on the SCTA time slot. For example, NC 134 may provide the base layer of data which includes a scalable video codec 138 to be transmitted on the dedicated CTA time slot and to provide the enhancement data layer to be transmitted on the SCTA time slot.

Although the scope of the present invention is not limited in this respect, it should be understood that embodiments of the invention may be to other wireless systems. For example, wireless networks that have both TDMA and random access period such as, for example WiMedia MAC titled DISTRIBUTED MEDIUM ACCESS CONTROL (MAC) FOR WIRELESS NETWORKS published by WiMedia Alliance on Oct. 2, 2007.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of communication in a wireless personal area network (WPAN) comprising:
   assigning a contention access period (CAP) within a superframe for communication within said WPAN according to a contention access mechanism, followed by a channel time allocation period (CTAP) within said superframe;
   allocating within the CTAP at least a shared channel time allocation (SCTA) for sharing by the WPAN and one or more other WPANs to allow said WPAN and said one or more other WPANs to perform communication during the SCTA according to a Carrier Sense Multiple Access With Collision Avoidance (CSMA/CA) protocol;
   announcing the shared channel time allocation to the one or more other WPANs to enable at least one WPAN of the one or more other WPANs to use the shared channel time allocation; and
   during said shared channel time allocation, communicating with a communicated device of said WPAN using a directional network access protocol, which is directed to said communicated device, wherein using the directional network access protocol includes using the CSMA/CA protocol on a direction towards said communicated device.

2. The method of claim 1 comprising:
   allocating within said CTAP at least one channel time allocation (CTA) dedicated to a user of said WPAN, wherein said CTA does not overlap CTAs allocated in said one or more other WPANs.

3. The method of claim 1, comprising:
   adjusting a length of the channel time allocation period and a length of the shared channel time allocation based on link traffic.

4. The method of claim 1, comprising synchronizing between said superframe and each of one or more superframes of said one or more other WPANs, wherein announcing comprises:
   announcing the shared channel time allocation in a sync beacon while other piconet controllers of the one or more other WPANs listen.

5. The method of claim 4, wherein the announcing of the shared channel time allocation is based on a number of announced WPANs.

6. The method of claim 1, wherein announcing comprises:
   announcing the shared channel time allocation in a dedicated frame, which includes an offset of the shared channel time allocation with respect to transmission of the dedicated frame.

7. The method of claim 1, wherein announcing comprises:
   announcing the shared channel time allocation to a plurality of links of said WPAN.

8. The method of claim 2, comprising:
   transmitting on the CTA a base layer of data; and
   transmitting on the shared channel time allocation an enhancement data layer of said data.

9. A wireless communication device comprising:
   a network controller to assign a contention access period (CAP) within a superframe for communication within a WPAN according to a contention access mechanism, followed by a channel time allocation period (CTAP) within said superframe; to allocate within the CTAP at least a shared channel time allocation (SCTA) for sharing by the WPAN and one or more other WPANs to allow said WPAN and said one or more other WPANs to perform communication during the SCTA according to a Carrier Sense Multiple Access With Collision Avoidance (CSMA/CA) protocol, and to announce the shared channel time allocation to the one or more other WPANs to enable at least one WPAN of the one or more other WPANs to use the shared channel time allocation; and
   a transceiver to communicate with a communicated device of said WPAN during said shared channel time allocation using a directional network access protocol, which is directed to said communicated device, wherein using the directional network access protocol includes using the CSMA/CA protocol on a direction towards said communicated device.

10. The wireless communication device of claim 9, wherein the network controller is able to allocate within said CTAP at least one channel time allocation (CTA) dedicated to a user of said WPAN, wherein said CTA does not overlap CTAs allocated in said one or more other WPANs.

11. The wireless communication device of claim 9, wherein the network controller is able to adjust a length of the channel time allocation period and a length of the shared channel time allocation based on link traffic.

12. The wireless communication device of claim 9, wherein the network controller is able to synchronize between said superframe and each of one or more superframes of said one or more other WPANs, and to announce the shared channel time allocation in a sync beacon while other piconet controllers of the one or more other WPANs listen.

13. The wireless communication device of claim 12, wherein the network controller is able to announce the shared channel time allocation based on a number of announced WPANs.

14. The wireless communication device of claim 9, wherein the network controller is able to announce the shared channel time allocation in a dedicated frame, which includes an offset of the shared channel time allocation with respect to transmission of the dedicated frame.

15. The wireless communication device of claim 9, wherein the network controller is able to announce the shared channel time allocation to a plurality of links of said WPAN.

16. The wireless communication device of claim 9, wherein the transceiver is to communicate with the communicated device using a beamforming scheme.

17. The wireless communication device of claim 10, wherein the network controller is able to provide a base layer of data to be transmitted on said dedicated CTA and to provide an enhancement data layer of said data to be transmitted on said shared channel time allocation.

18. The wireless communication device of claim 17 comprising a wireless display, wherein the network controller of the wireless display is able to provide the base layer of said data, which includes a scalable video codec to be transmitted on the dedicated CTA and to provide the enhancement data layer of said data to be transmitted on the shared channel time allocation.

19. A wireless communication system comprising:
a piconet network controller comprising:
one or more antennas;
a network controller to assign a contention access period (CAP) within a superframe for communication within a WPAN according to a contention access mechanism, followed by a channel time allocation period (CTAP) within said superframe; to allocate within the CTAP at least a shared channel time allocation (SCTA) for sharing by the WPAN and one or more other WPANs to allow said WPAN and said one or more other WPANs to perform communication during the SCTA according to a Carrier Sense Multiple Access With Collision Avoidance (CSMA/CA) protocol, and to announce the shared channel time allocation to the one or more other WPANs to enable at least one WPAN of the one or more other WPANs to use the shared channel time allocation; and
a transceiver to communicate with a communicated device of said WPAN during said shared channel time allocation using a directional network access protocol, which is directed to said communicated device, wherein using the directional network access protocol includes using the CSMA/CA protocol on a direction towards said communicated device.

20. The wireless communication system of claim 19, wherein the network controller is able to allocate within said CTAP at least one channel time allocation (CTA) dedicated to a user of said WPAN, wherein said CTA does not overlap CTAs allocated in said one or more other WPANs.

21. The wireless communication system of claim 19, wherein the network controller is able to adjust a length of the channel time allocation period and a length of the shared channel time allocation based on link traffic.

22. The wireless communication system of claim 19, wherein the network controller is able to synchronize between said superframe and each of one or more superframes of said one or more other WPANs, and to announce the shared channel time allocation in a sync beacon while other piconet controllers of the one or more other WPANs listen.

23. The wireless communication system of claim 22, wherein the network controller is able to announce the shared channel time allocation based on a number of announced WPANs.

24. The wireless communication system of claim 19, wherein the network controller is able to announce the shared channel time allocation in a dedicated frame, which includes an offset of the shared channel time allocation with respect to transmission of the dedicated frame.

25. The wireless communication system of claim 19, wherein the network controller is able to announce the shared channel time allocation to a plurality of links of said WPAN.

26. The wireless communication system of claim 19, wherein the transceiver is to communicate with the communicated device using a beamforming scheme.

27. The wireless communication system of claim 20, wherein the network controller is able to provide a base layer of data to be transmitted on said CTA and to provide an enhancement data layer of said data to be transmitted on said shared channel time allocation.

28. The wireless communication system of claim 27, wherein the piconet network controller comprises:
a wireless display, and wherein the network controller is able to provide the base layer of said data, which includes a scalable video codec to be transmitted on the CTA and to provide the enhancement data layer of said data to be transmitted on the shared channel time allocation.

\* \* \* \* \*

UNITED STATES PATENT AND TRADEMARK OFFICE
CERTIFICATE OF CORRECTION

PATENT NO. : 8,363,579 B2
APPLICATION NO. : 12/329655
DATED : January 29, 2013
INVENTOR(S) : Guoqing Li et al.

It is certified that error appears in the above-identified patent and that said Letters Patent is hereby corrected as shown below:

On the Title page, in item (56), in column 2, under "Other Publications", line 9, delete "PCT/US2009/1065588," and insert -- PCT/US2009/065588, --, therefor.

On the Title page, in item (56), in column 2, under "Other Publications", line 12, delete "Xue,"Enhanced" and insert -- Xue, "Enhanced --, therefor.

Signed and Sealed this
Ninth Day of April, 2013

Teresa Stanek Rea
*Acting Director of the United States Patent and Trademark Office*